US012773889B2

(12) United States Patent
Yu

(10) Patent No.: US 12,773,889 B2
(45) Date of Patent: Oct. 27, 2026

(54) SMART AIR-CONDITIONING CONTROL METHOD AND APPARATUS OF A VEHICLE

(71) Applicants: HYUNDAI MOTOR COMPANY, Seoul (KR); KIA CORPORATION, Seoul (KR)

(72) Inventor: Sangwoo Yu, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 133 days.

(21) Appl. No.: 18/782,782

(22) Filed: Jul. 24, 2024

(65) Prior Publication Data

US 2025/0262909 A1 Aug. 21, 2025

(30) Foreign Application Priority Data

Feb. 20, 2024 (KR) ........................ 10-2024-0024492

(51) Int. Cl.
*B60H 1/00* (2006.01)

(52) U.S. Cl.
CPC ..... *B60H 1/00742* (2013.01); *B60H 1/00757* (2013.01)

(58) Field of Classification Search
CPC ............ B60H 1/00285; B60H 1/00742; B60H 1/00757; B60H 1/00064; B60H 1/00964; B60H 1/2218; B60H 1/2226; B60H 2001/00192; B60H 2001/002; B60H 2001/00185
See application file for complete search history.

(56) References Cited

U.S. PATENT DOCUMENTS

| | | | | |
|---|---|---|---|---|
| 2002/0019213 | A1* | 2/2002 | Yoshinori | B60H 1/00742 454/155 |
| 2014/0034266 | A1* | 2/2014 | Tabei | B60H 1/00842 165/42 |
| 2019/0135073 | A1* | 5/2019 | Higashihara | B60N 2/5628 |
| 2021/0209927 | A1* | 7/2021 | Hedges | G08B 25/005 |
| 2022/0371401 | A1* | 11/2022 | Roth | B60H 1/00735 |
| 2023/0049777 | A1* | 2/2023 | Feltham | B60H 1/00871 |
| 2024/0217407 | A1* | 7/2024 | Paes | B60N 2/002 |
| 2025/0222741 | A1* | 7/2025 | Migneco | B60H 1/00771 |

* cited by examiner

*Primary Examiner* — Marc E Norman
(74) *Attorney, Agent, or Firm* — Lempia Summerfield Katz LLC

(57) ABSTRACT

A smart air-conditioning control apparatus of a vehicle may include: a power supply unit configured to activate and deactivate a smart air-conditioning control function of the vehicle based on a user input, a detector configured to detect whether an occupant is seated in each seat through a sensor disposed in each seat in the vehicle, when the smart air-conditioning control function is activated, and a controller configured to selectively control an air-conditioner designated to an occupied seat, which is detected as being occupied by an occupant among the seats in the vehicle.

8 Claims, 5 Drawing Sheets

SMART AIR-CONDITIONING CONTROL METHOD AND APPARATUS OF A VEHICLE

CROSS-REFERENCE TO RELATED APPLICATION

This application claims priority to and the benefit of Korean Patent Application No. 10-2024-0024492, filed in the Korean Intellectual Property Office on Feb. 20, 2024, the entire contents of which are incorporated herein by reference.

BACKGROUND

(a) Field

The present disclosure relates to a smart air-conditioning control method and apparatus of a vehicle. More particularly, the present disclosure relates to a smart air-conditioning control method and apparatus of a vehicle based on detection of occupancy of individual seats in the vehicle.

(b) Description of the Related Art

The individual air-conditioning function of the driver's seat is designed to save energy used for air conditioning when only the driver is in the vehicle, and when the user presses a certain button, e.g., a Driver Only button, air conditioning supply to the passenger seat and rear seat is stopped and cooling/heating air conditioning is supplied only to the driver's seat.

The air conditioning-linked automatic control function automatically turns on and off the seat ventilation and heating function according to the current vehicle interior temperature and the air conditioning temperature set by the user. The individual air-conditioning function of the driver's seat must be turned on or off by the user each time the engine is started or the number of passengers changes. The air conditioning-linked automatic control function is provided only for the driver's seat, even when a person is riding in the passenger seat or rear seat.

The statements in this section merely provide background information related to the present disclosure and may not constitute prior art.

SUMMARY

The present disclosure provides a smart air-conditioning control method and apparatus of a vehicle capable of intelligently providing an individual air-conditioning function of the driver's seat or a heating and ventilation function of each individual seat based on occupancy detection sensor information of passenger seats and rear seats, without a need of separate manipulation of a driver.

In an embodiment of the present disclosure, a smart air-conditioning control apparatus of a vehicle may include: a power supply unit configured to activate and deactivate a smart air-conditioning control function of the vehicle based on a user input, a detector configured to detect whether an occupant is seated in a seat through a sensor disposed in each of seats in the vehicle, when the smart air-conditioning control function is activated; and a controller configured to selectively control an air-conditioner designated to an occupied seat, which is detected as being occupied by an occupant among the seats in the vehicle.

The user input may be received through an air-conditioner manipulation device, which is configured in the vehicle, including: buttons, and a part for at least one of voice recognition or motion recognition.

The seats in the vehicle may include a driver's seat, a passenger seat, a first rear seat and a second rear seat.

The detector may be configured to detect whether an occupant is seated in each seat through a weight sensor disposed in each seat.

The detector may be configured to detect whether an occupant is seated in a rear seat through a radar-based rear seat occupant detecting (ROA) sensor.

The controller may be configured to integrally control the air-conditioner, and a radiant heat warmer and a heating and ventilation function of the occupied seat.

The controller may directly control an operation of the air-conditioner, and may transmit control information for a radiant heat warmer and heating and ventilation function to the occupied seat individually operated by a separate controller, to indirectly control an operation of the occupied seat.

When the occupied seat is detected, the controller may start the air-conditioner control, and may provide a notification on permission on transmission of information for activation and controlling of the radiant heat warmer and the heating and ventilation function of the occupied seat.

The detector may be configured to detect whether an occupant is seated in each seat through a body temperature detecting sensor disposed in each seat.

The controller may be configured to control the air-conditioner, a radiant heat warmer, heating and ventilation function designated to the occupied seat based on a body temperature of the occupant measured through the body temperature detecting sensor.

In another embodiment of the present disclosure, a smart air-conditioning control method may include: activating or deactivating a smart air-conditioning control function of a vehicle based on a user input; detecting whether an occupant is seated in a seat through a sensor disposed in each of seats in the vehicle, when the smart air-conditioning control function is activated; and selectively controlling an air-conditioner designated to an occupied seat, which is detected as being occupied by an occupant among the seats in the vehicle.

The user input may be received through an air-conditioner manipulation device including buttons and a part for at least one of voice recognition or motion recognition that are configured in the vehicle.

The seats in the vehicle may include a driver's seat, a passenger seat, first rear seat and a second rear seat.

The detecting whether the occupant is seated may include detecting whether an occupant is seated in each seat, through a weight sensor disposed in each seat.

The detecting whether the occupant is seated may include detecting whether an occupant is seated in a rear seat, through a radar-based rear seat occupant detecting (ROA) sensor.

The selectively controlling the air-conditioner designated to the occupied seat may include integrally controlling the air-conditioner, and a radiant heat warmer and heating and ventilation function of the occupied seat.

The selectively controlling the air-conditioner designated to the occupied seat may include directly controlling an operation of the air-conditioner, and indirectly controlling an operation of the occupied seat, by transmitting control information for a radiant heat warmer and heating and ventilation function to the occupied seat individually operated by a separate controller.

When the occupied seat is detected, the selectively controlling the air-conditioner designated to the occupied seat may further include starting the air-conditioner control, and providing a notification on permission on transmission of the control information for activation and controlling of the radiant heat warmer and the heating and ventilation function of the occupied seat.

The detecting whether the occupant is seated may include detecting whether an occupant is seated in each seat, through a body temperature detecting sensor disposed in each seat.

The selectively controlling the air-conditioner designated to the occupied seat may include controlling the air-conditioner, a radiant heat warmer, heating and ventilation function designated to the occupied seat, based on a body temperature of the occupant measured through the body temperature detecting sensor.

A smart air-conditioning control method and apparatus of a vehicle according to an embodiment may intelligently provide an individual air-conditioning function of the driver's seat or a heating and ventilation function of each individual seat based on occupancy detection sensor information of passenger seats and rear seats without a separate manipulation of a driver, which becomes efficient.

Figure 1:
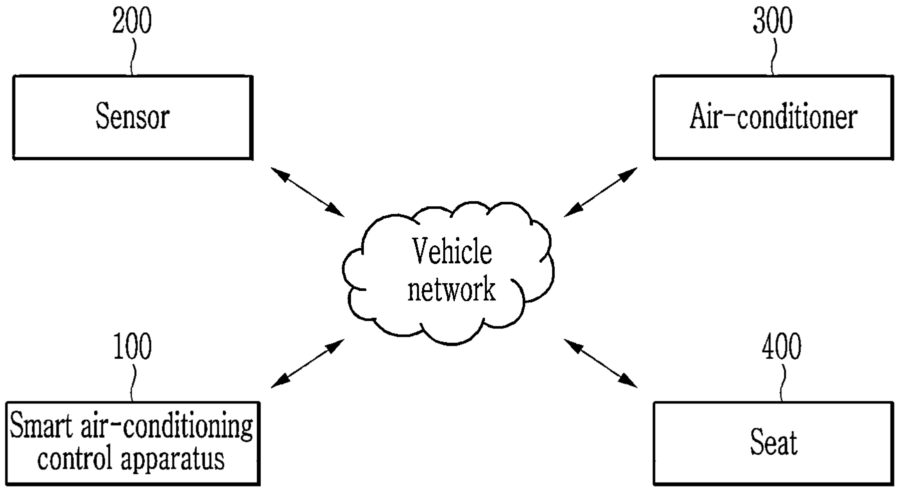
FIG. 1 schematically illustrates a smart air-conditioning control system of a vehicle according to an embodiment.

The drawings described herein are for illustration purposes only and are not intended to limit the scope of the present disclosure in any way.

DETAILED DESCRIPTION

Some embodiments of the disclosure are described more fully hereinafter with reference to the accompanying drawings such that a person of ordinary skill in the art may easily implement the embodiments. As those having ordinary skill in the art would realize, the described embodiments may be modified in various different ways, all without departing from the spirit or scope of the present disclosure. In order to clarify the present disclosure, parts that are not related to the description have been omitted, and the same elements or equivalents are referred to with the same reference numerals throughout the specification.

In addition, unless explicitly described to the contrary, the word "comprise" and variations such as "comprises" or "comprising" should be understood to imply the inclusion of stated elements but not the exclusion of any other elements. Terms including an ordinary number, such as first and second, are used for describing various constituent elements, but the constituent elements are not limited by the terms. The terms are only used to differentiate one component from other components.

In addition, the terms "unit", "part" or "portion", "-er", and "module" in the specification refer to a unit that processes at least one function or operation, which may be implemented by hardware, software, or a combination of hardware and software.

Hereinafter, embodiments of the present disclosure are described with reference to the drawings.

FIG. 1 schematically illustrates a smart air-conditioning control system of a vehicle according to an embodiment.

Referring to FIG. 1, smart air-conditioning control system may include a smart air-conditioning control apparatus 100, a sensor 200, an air-conditioner 300, and a seat 400.

The smart air-conditioning control apparatus 100 may intelligently provide an individual air-conditioning function of the driver's seat or a heating and ventilation function of each individual seat based on occupancy detection sensor information of a passenger seat and a rear seat, without a need of separate manipulation of a driver.

The sensor 200 may detect whether an occupant is seated. The sensor 200 may be disposed in each seat of the vehicle. The sensor 200 may be provided in various types including a weight sensor, a radar sensor, a temperature sensor. When an occupant occupies (i.e., sits) on a seat, the sensor 200 may detect this, and notify it to the smart air-conditioning control apparatus 100.

In an embodiment, the air-conditioner 300 may include an air-conditioning device, a radiant heat warmer, and a heater. The radiant heat warmer may be a device configured to heat a space within the vehicle by using a radiant heat. In the vehicle, the radiant heat warmer may perform the heating function in the manner of generating radiant thermal energy to heat a space or an object within the vehicle.

The air-conditioner 300 may be connected to the smart air-conditioning control apparatus 100 through a vehicle network. The air-conditioner 300 may be provided in a plurality of air-conditioners. The plurality of air-conditioners 300 may be designated to each seat in the vehicle. For example, the air-conditioner 300 may include the passenger seat air-conditioner designated to the passenger seat and the rear seat air-conditioner designated to the rear seat. The plurality of air-conditioners 300 may be integrally controlled through the smart air-conditioning control apparatus 100.

In another embodiment, the radiant heat warmer may be individually controlled for each occupied seat by individual controllers, separately from the air-conditioner. The seats 400 may include a driver's seat, a passenger seat, and at least one rear seat. The driver's seat, the passenger seat, and the at least one rear seat may be individually controlled. The at least one rear seat may be provided in a plural quantity, and may include a first rear seat and a second rear seat. A plurality of rear seats may be individually controlled.

The sensor 200 may be disposed in each of the seats 400. The heating and ventilation function may be included in the seat 400. The seats 400 may be divided into the occupied seat occupied by the occupant and a non-occupied seat that is not occupied by an occupant. The heating and ventilation function of the seats 400 may be controlled through the smart air-conditioning control apparatus 100 connected through a network.

Figure 2:
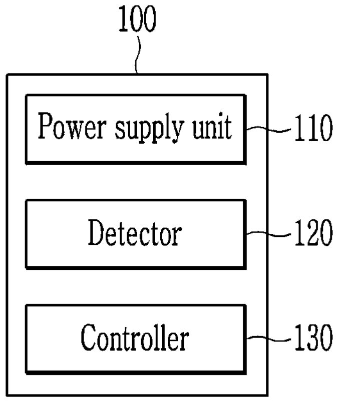
FIG. 2 is a block diagram of a smart air-conditioning control apparatus of a vehicle according to an embodiment.

FIG. 2 is a block diagram of a smart air-conditioning control apparatus of a vehicle according to an embodiment.

Referring to FIG. 2, the smart air-conditioning control apparatus 100 may include a power supply unit 110, a detector 120 and a controller 130.

The power supply unit 110 may activate or deactivate a smart air-conditioning control function of the vehicle based on the user's input.

The user input may be received through an air-conditioner manipulation device including buttons, and a part for at least one of voice recognition or motion recognition in the vehicle.

In other words, the power supply unit 110 may receive the user input inputted through various types of in-vehicle air-conditioner manipulation device.

For example, when the user is boarded on the vehicle and inputs an activation signal using a button in the vehicle to activate the smart air-conditioning control function, the power supply unit 110 may activate the smart air-conditioning control function.

When the smart air-conditioning control function is activated, the detector 120 may detect whether an occupant is seated in each seat through a sensor disposed in each seat in the vehicle.

Here, seats in the vehicle may include the passenger seat, the first rear seat and the second rear seat. In other words, the detector 120 may detect whether an occupant is seated in the passenger seat and the rear seat as well as the driver's seat.

The detector 120 may detect the occupant's seating through a plurality of sensors disposed in disposed in each seat. The plurality of sensors may include the weight sensor, the temperature sensor, the radar sensor, or the like.

The sensor disposed in each seat may include a plurality of different sensors. For example, the weight sensor, a body temperature sensor may be disposed in the passenger seat. The weight sensor, the body temperature sensor and radar-based the rear seat occupant detecting sensor may be disposed in the rear seat. As for the rear seat occupant detecting function, a function known as the rear occupant alert (ROA) may be referred to, and hereinafter, the rear seat occupant detecting sensor may also be referred to as an ROA sensor.

The detector 120 may detect whether an occupant is seated in each seat through the weight sensor disposed in each seat. When the occupant occupies a seat, the detector 120 may determine that the seat is occupied by detecting a weight of the occupant.

The detector 120 may determine whether an occupant is actually seated on the rear seat determined to be occupied through the weight sensor of the rear seat, through a radar-based the rear seat occupant detecting (ROA) sensor.

The detector 120 may detect whether an occupant is seated in each seat through a body temperature detecting sensor disposed in each seat.

When a weight is detected on the passenger seat through the weight sensor, the detector 120 may determine that the passenger seat is occupied not by an article but by a passenger, by detecting a body temperature of the occupant through the body temperature sensor.

The controller 130 may selectively control the air-conditioner designated to the occupied seat detected to be occupied by an occupant among the seats in the vehicle.

The controller 130 may integrally control an air-conditioner, and the heating and ventilation function of the occupied seat. In other words, the controller 130 may perform controlling of input and output for not only the air-conditioner designated to the occupied seat but also the heating and ventilation function of each occupied seat.

In the case that the radiant heat warmer is not included in the air-conditioner but individually controlled for each occupied seat, the controller 130 may integrally control the radiant heat warmer function together with the heating and ventilation function of the occupied seat.

In other words, the controller 130 may directly control an operation of the air-conditioner, and may transmit control information for the radiant heat warmer, the heating and ventilation function to the occupied seat individually operated by a separate controller, to indirectly control an operation of the occupied seat.

The controller 130 may transmit the control information for the radiant heat warmer, the heating and ventilation function to each occupied seat, and the separate controller disposed in each occupied seat may activate and control the radiant heat warmer and the heating and ventilation function of the occupied seat, based on the corresponding control information.

When the occupied seat is detected, the controller 130 may start controlling the air-conditioner, and may provide a notification on permission on transmission of information for activation and controlling of the radiant heat warmer and the heating and ventilation function of the occupied seat.

When the control information for air-conditioner control for the occupied seat is generated, the controller 130 may transmit the corresponding the control information to the individual controller of each occupied seat for controlling the radiant heat warmer and the heating and ventilation function. The controller 130 may provide, to the user, a notification on whether transmission of the control information shall be allowed.

When the user allows to transmit the control information according to air-conditioner control to the occupied seat each, the controller 130 may transmit the control information. The occupied seat may individually control the radiant heat warmer, the heating and ventilation function, based on the control information.

The controller 130 may control the air-conditioner, the radiant heat warmer, the heating and ventilation function designated to the occupied seat based on the body temperature of the occupant measured through the body temperature detecting sensor. In other words, the controller 130 may control the air-conditioner, the radiant heat warmer, the heating and ventilation function in real time to a preset temperature based on the user's body temperature.

Figure 3:
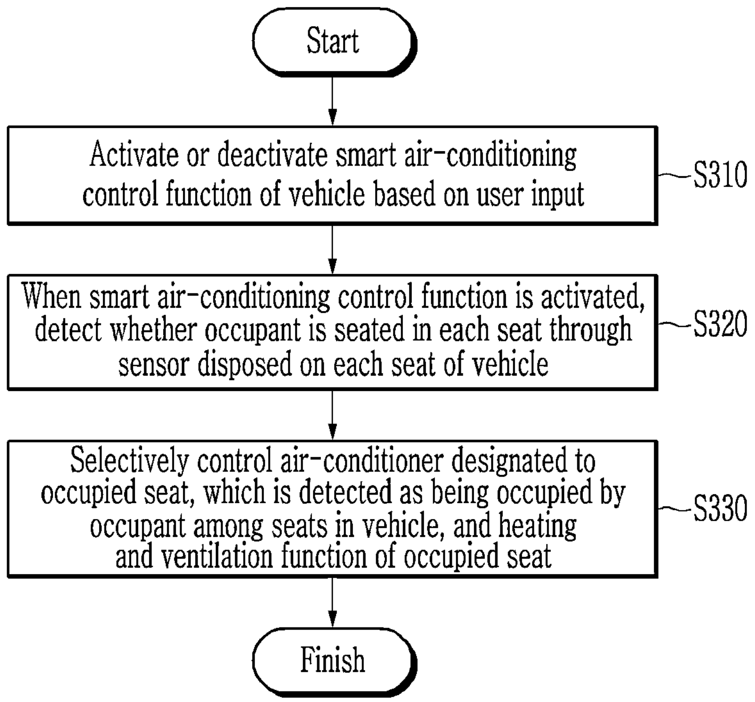
FIG. 3 is a flowchart of a smart air-conditioning control method according to an embodiment.

FIG. 3 is a flowchart of a smart air-conditioning control method according to an embodiment. The smart air-conditioning control method of FIG. 3 may be performed through the smart air-conditioning control apparatus 100 (see FIG. 1).

In FIG. 3, at step S310, the smart air-conditioning control apparatus 100 may activate or deactivate the smart air-conditioning control function of the vehicle based on the user's input.

At step S320, when the smart air-conditioning control function is activated, the smart air-conditioning control apparatus 100 may detect whether an occupant is seated in each seat through a sensor disposed in each seat in the vehicle.

The smart air-conditioning control apparatus 100 may detect whether an occupant is seated in each seat through the weight sensor disposed in each seat.

The smart air-conditioning control apparatus 100 may detect whether an occupant is seated in the rear seat through a radar-based the rear seat occupant detecting (ROA) sensor.

The smart air-conditioning control apparatus 100 may detect whether an occupant is seated in each seat through the body temperature detecting sensor disposed in each seat.

At step S330, the smart air-conditioning control apparatus 100 may selectively control the radiant heat warmer and the heating and ventilation function of the occupied seat and the air-conditioner designated to the occupied seat detected to be occupied by an occupant among the seats in the vehicle.

The smart air-conditioning control apparatus 100 may integrally control not only the air-conditioner but also the radiant heat warmer and the heating and ventilation function of the occupied seat.

The smart air-conditioning control apparatus 100 may directly control the operation of the air-conditioner, and may transmit the control information for the radiant heat warmer, the heating and ventilation function to the occupied seat individually operated by a separate controller, to indirectly control the operation of the occupied seat.

When the occupied seat is detected, the smart air-conditioning control apparatus 100 may start controlling of the air-conditioner, and may provide, to the user, a notification on permission on transmission of the control information for activation and controlling of the radiant heat warmer and the heating and ventilation function of the occupied seat.

The smart air-conditioning control apparatus 100 may control the air-conditioner, the radiant heat warmer, the heating and ventilation function designated to the occupied seat based on the body temperature of the occupant measured through the body temperature detecting sensor.

Figure 4:
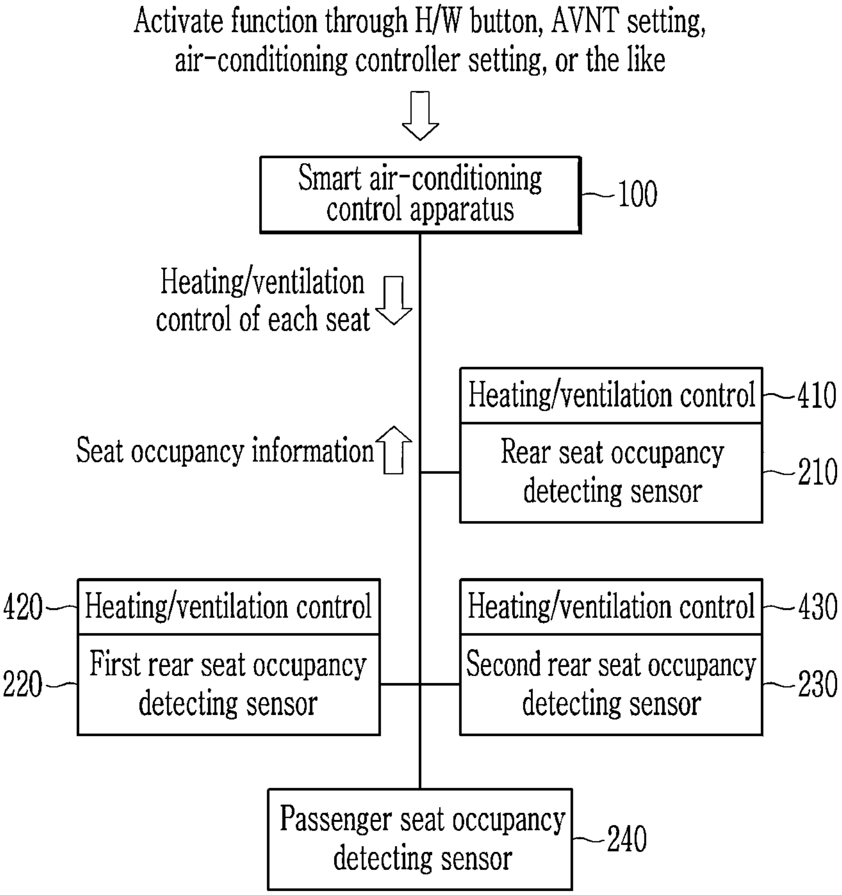
FIG. 4 is a drawing for explaining a smart air-conditioning control method according to an embodiment.

FIG. 4 is a drawing for explaining a smart air-conditioning control method according to an embodiment. The smart air-conditioning control method of FIG. 4 may be performed through the smart air-conditioning control apparatus 100 (see FIG. 1).

FIG. 4 shows a method for controlling the heating and ventilation function of each seat of the smart air-conditioning control apparatus 100.

In FIG. 4, the smart air-conditioning control apparatus 100 may activate the smart air-conditioning control function through hardware (H/W) buttons in the vehicle, an audio video navigation telematics (AVNT) setting, air-conditioning controller setting, or the like.

The smart air-conditioning control apparatus 100 may control the heating and ventilation function for each seat through the smart air-conditioning control function. The smart air-conditioning control apparatus 100 may receive the occupant's seating information for each seat. The smart air-conditioning control apparatus 100 may detect the occupant's seating for each seat through a sensor disposed in each seat and may receive information on the occupied seat occupied by the occupant.

The sensor 200 (see FIG. 1) may include the passenger seat occupancy detecting sensor 210, the first rear seat occupancy detecting sensor 220, the second rear seat occupancy detecting sensor 230 and the passenger seat occupancy detecting sensor 240.

Each of the passenger seat occupancy detecting sensor 210, the first rear seat occupancy detecting sensor 220, the second rear seat occupancy detecting sensor 230 and the rear seat occupancy detecting sensor 240 may include at least one sensor including the weight sensor, the radar sensor, and the body temperature sensor.

The passenger seat, the first rear seat and the second rear seat may individually control the heating and ventilation function. That is, the smart air-conditioning control apparatus 100 may provide the control information for the heating and ventilation function of each seat to each seat, and each seat may operate the heating and ventilation function based on the provided control information. The control information may include the sensor information detected by a sensor and preset information generated based on the sensor information.

The smart air-conditioning control apparatus 100 may integrally control the heating and ventilation function of the passenger seat, the first rear seat, and the second rear seat.

When an occupancy of the passenger seat is detected through the passenger seat occupancy detecting sensor 210, the smart air-conditioning control apparatus 100 may perform a heating/ventilation function control 410 of the passenger seat.

When an occupancy of the first rear seat is detected through the first rear seat occupancy detecting sensor 220, the smart air-conditioning control apparatus 100 may perform heating/ventilation control 420 of the first rear seat.

When an occupancy of the second rear seat is detected through the second rear seat occupancy detecting sensor 230, the smart air-conditioning control apparatus 100 may perform a heating/ventilation control 430 of the second rear seat.

Figure 5:
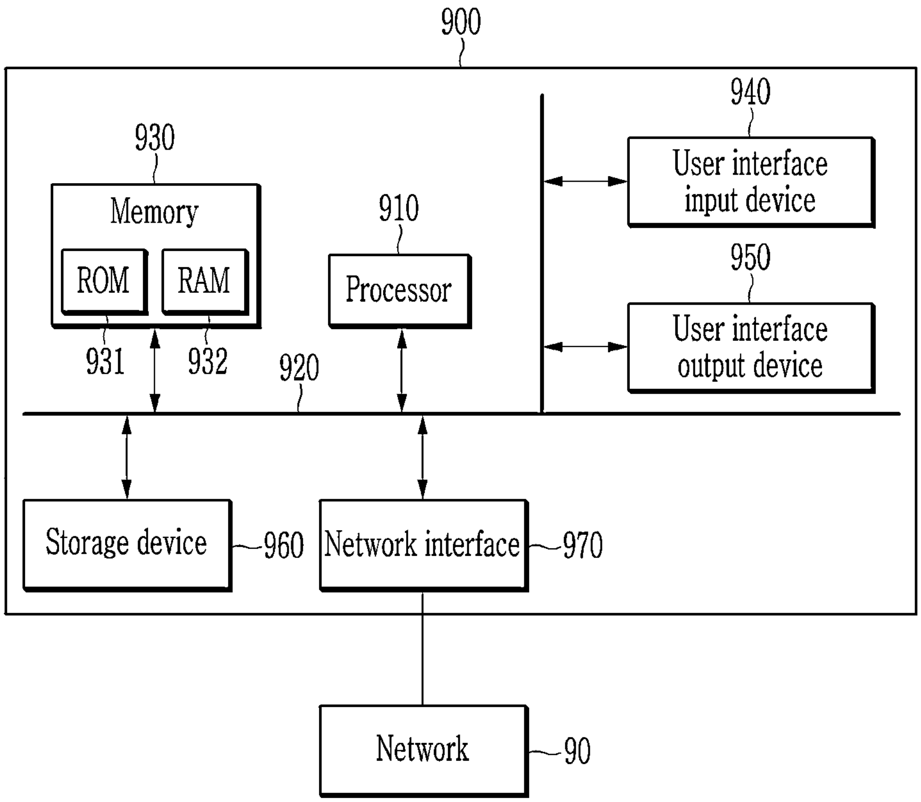
FIG. 5 is a drawing for explaining a computing device according to an embodiment.

FIG. 5 is a drawing for explaining a computing device according to an embodiment.

Referring to FIG. 5, a smart air-conditioning control method and apparatus of a vehicle according to an embodiment may be implemented by using a computing device 900.

The computing device 900 may include at least one of a processor 910, a memory 930, the user interface input device 940, the user interface output device 950 and a storage device 960 that communicate through a bus 920. The computing device 900 may also include a network interface 970 electrically connected to a network 90. The network interface 970 may transmit or receive signals with other entities through the network 90.

The processor 910 may be implemented in various types such as a micro controller unit (MCU), an application processor (AP), a central processing unit (CPU), a graphic processing unit (GPU), a neural processing unit (NPU), and the like, and may be any type of semiconductor device capable of executing instructions stored in the memory 930 or the storage device 960. The processor 910 may be configured to implement the functions and methods described above with respect to FIG. 1 to FIG. 4.

The memory 930 and the storage device 960 may include various types of volatile or non-volatile storage media. For example, the memory may include read-only memory (ROM) 931 and a random-access memory (RAM) 932. In this embodiment, the memory 930 may be located inside or outside processor 910, and the memory 930 may be connected to the processor 910 through various known means.

In some embodiments, at least some configurations or functions of a smart air-conditioning control method and apparatus of a vehicle according to an embodiment may be implemented as a program or software executable by the computing device 900, and program or software may be stored in a computer-readable medium.

In some embodiments, at least some configurations or functions of a smart air-conditioning control method and apparatus of a vehicle according to an embodiment may be implemented by using hardware or circuitry of the computing device 900, or may also be implemented as separate hardware or circuitry that may be electrically connected to the computing device 900.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

DESCRIPTION OF SYMBOLS

100: smart air-conditioning control apparatus
110: power supply unit
120: detector

130: controller

200: sensor

300: air-conditioner

400: seat

What is claimed is:

1. A smart air-conditioning control apparatus of a vehicle, the apparatus comprising:

a memory storing instructions; and a processor configured to execute the instructions to:

activate or deactivate a smart air-conditioning control function of the vehicle based on a user input;

detect whether an occupant is seated in each of a plurality of seats of the vehicle, by using a plurality of sensors including a weight sensor and a radar-based rear seat occupant detecting (ROA) sensor, and determine that a corresponding seat is occupied by an actual occupant based on a combination of detection results of the plurality of sensors;

selectively control an air-conditioner designated to an occupied seat;

integrally control the air-conditioner, a radiant heat warmer, and a heating and ventilation function corresponding to the occupied seat;

directly control the air-conditioner, and indirectly control the radiant heat warmer and the heating and ventilation function by transmitting control information to a separate seat controller provided in each seat;

upon detection of the occupied seat, generate the control information, provide a user notification requesting permission for transmission of the control information, and transmit the control information only when the permission is received.

2. The smart air-conditioning control apparatus of claim 1, wherein the user input is received through an air-conditioner manipulation device comprising a button and a part for at least one of voice recognition or motion recognition configured in the vehicle.

3. The smart air-conditioning control apparatus of claim 1, wherein the plurality of seats in the vehicle comprises a driver's seat, a passenger seat, a first rear seat, and a second rear seat.

4. The smart air-conditioning control apparatus of claim 1, wherein the plurality of sensors includes a body temperature detecting sensor disposed in each seat and configured to detect whether an occupant is seated in each seat.

5. A smart air-conditioning control method for a vehicle, comprising:

activating or deactivating a smart air-conditioning control function of a vehicle based on a user input;

detecting whether an occupant is seated in each of a plurality of seats of the vehicle by using a plurality of sensors including a weight sensor and a radar-based rear seat occupant detecting (ROA) sensor;

determining that a corresponding seat is occupied by an actual occupant based on a combination of detection results of the plurality of sensors;

selectively controlling an air-conditioner designated to an occupied seat;

integrally controlling the air-conditioner, a radiant heat warmer, and a heating and ventilation function corresponding to the occupied seat;

directly controlling the air-conditioner, and indirectly controlling the radiant heat warmer and the heating and ventilation function by transmitting control information to a separate seat controller provided in each seat;

upon detection of the occupied seat, generating the control information for the radiant heat warmer and the heating and ventilation function, providing a user notification requesting permission for transmission of the control information, and transmitting the control information to the separate seat controller only when the permission is received from the user.

6. The smart air-conditioning control method of claim 5, wherein the user input is received through an air-conditioner manipulation device comprising a button and a part for at least one of voice recognition or motion recognition configured in the vehicle.

7. The smart air-conditioning control method of claim 5, wherein the plurality of seats in the vehicle comprises a driver's seat, a passenger seat, first rear seat, and a second rear seat.

8. The smart air-conditioning control method of claim 5, wherein the detecting whether the occupant is seated comprises detecting whether an occupant is seated in each seat, through a body temperature detecting sensor disposed in each seat.

* * * * *